Oct. 24, 1961   L. H. LAMOURIA   3,005,500
AUTOMATIC RETRACTING MECHANISM FOR AGRICULTURAL MACHINERY
Filed Aug. 23, 1957   2 Sheets-Sheet 2
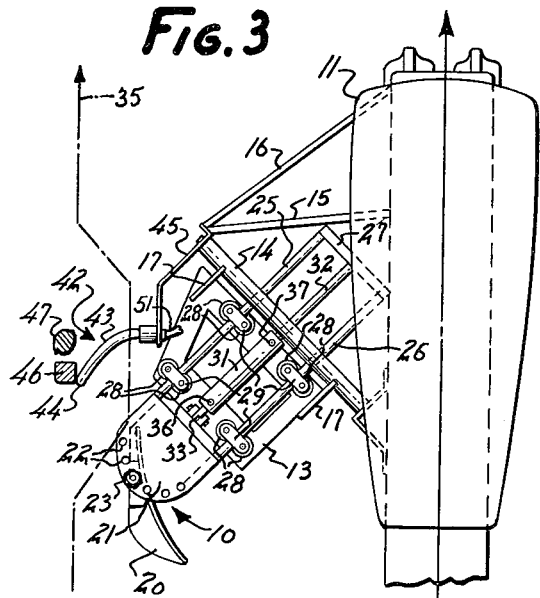
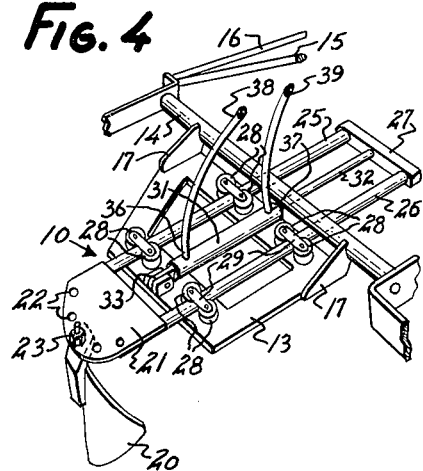
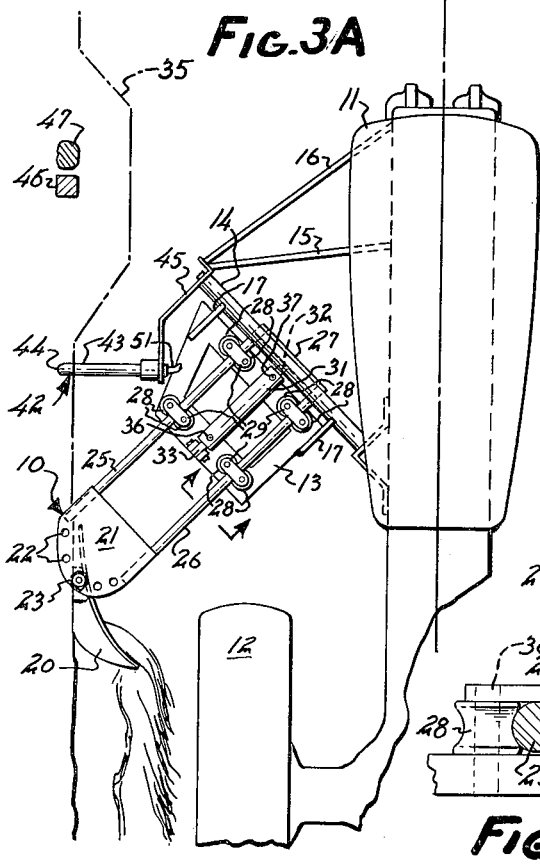
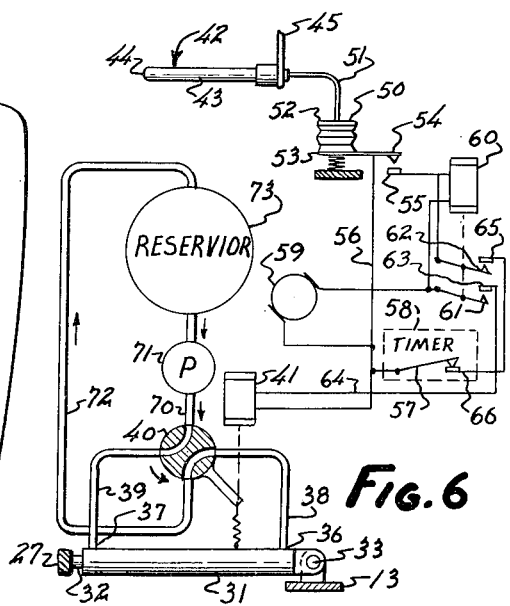
INVENTOR.
LLOYD H. LAMOURIA
ATTORNEY

United States Patent Office 3,005,500
Patented Oct. 24, 1961

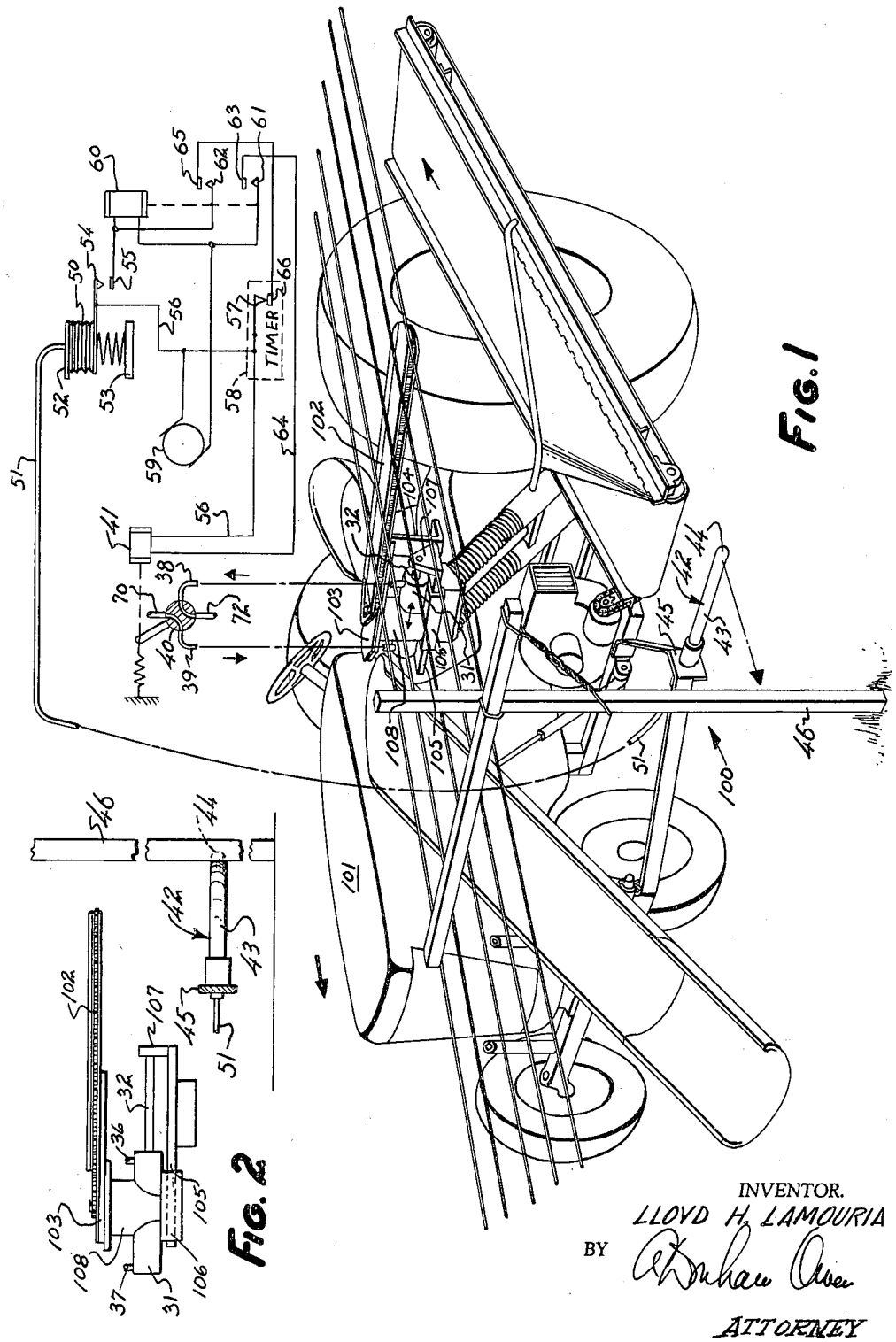

3,005,500
AUTOMATIC RETRACTING MECHANISM FOR AGRICULTURAL MACHINERY
Lloyd H. Lamouria, Davis, Calif., assignor to The Regents of the University of California, Berkeley, Calif.
Filed Aug. 23, 1957, Ser. No. 679,847
4 Claims. (Cl. 172—6)

This invention relates to improvements in agricultural machinery. More particularly, it relates to a combination including an automatic retracting mechanism for use in a grape-harvesting machine, French plow, or the like. This application is a continuation-in-part of my co-pending application, Serial No. 606,145, filed August 24, 1956, now patent No. 2,893,194, issued July 7, 1959.

When using a mechanical harvester in a vineyard, care must be taken not to damage the grapevines or the grapestakes adjacent the vines. Some growers do not give sufficient attention to pruning, so as to concentrate the grape clusters away from the axis of the trellis supporting the vines. As a result, a relatively large number of grape clusters form directly in line with the stakes, and harvest is not complete unless these are collected, as well as the clusters that are easy to harvest. This problem is particularly serious with mechanical grape-harvesters which have recently been devised, particularly with the harvester shown in the parent application, Serial No. 606,145, filed August 24, 1956. The problem is principally that of cutting the stems in between the stakes without letting the cutting means strike the stakes themselves or the trunks of the vines.

The present invention solves these problems by providing a novel hydraulic sensing apparatus for automatically retracting the cutting bar just before it reaches a stake, in connection with a time-delay mechanism for holding it retracted while it passes the stake and vine trunk, and means for automatically restoring it to its outwardly projected position when it has passed them. The sensing apparatus to be described in this application could be used as the eyes for a continuous steering system used on tractors and other self propelled machines. Or because of its ruggedness and simplicity it could be used as an elevation sensing unit.

Obviously, there are other devices in which the retraction mechanism of this invention can be used, and these applications will occur to the skilled agricultural engineer, so that it is not necessary to expand on them herein. For example, the French plows that are used to cultivate vineyards have means by which the plowman can manually draw the plow back so that it can pass around a vine and its adjacent grapestake, after which the plowman can manually project it out for cultivation in line with and between the vines and stakes. However, these plows have required careful operation and have been manually controlled, so that heretofore they have been far from fully satisfactory. Devices utilizing a spring loaded system permit some plows to be deflected by the vine. These units can not be used on young vines because the deflecting force required exceeds the rigidity of the vines. The present invention is applicable to these plows to solve this problem.

Other objects and advantages of the invention will appear from the following description of some preferred embodiments thereof.

In the drawings:

FIG. 1 is a view in perspective of a grape harvester incorporating the senser and retractor of the invention. The hydraulic and electrical circuit elements are shown diagrammatically, connected into the device itself.

FIG. 2 is a fragmentary view of parts of the senser and cutter of FIG. 1 with the cutter shown in retracted position as a result of the deflection of the senser. Parts are broken aways and shown in section.

FIG. 3 is a top plan view of a French plow employing an automatic retracting apparatus embodying the principles of my invention. The plow is pulled by a tractor and is shown in retracted position as it moves parallel to a row of grapestakes and vines.

FIG. 3A is a view similar to FIG. 3 showing the plow in its normal, outer or unretracted position. The path of the plow is indicated in both FIGS. 3 and 3A by a dot-dash line, and only a portion of the tractor is shown.

FIG. 4 is a view in perspective of the French plow and retraction device of FIG. 3.

FIG. 5 is an enlarged fragmentary view in section taken along the line 5—5 of FIG. 3A.

FIG. 6 is a diagrammatic plan view of the sensing and retracting apparatus showing both an hydraulic circuit and an electrical circuit, as used in the device of FIG. 3.

FIGS. 1 and 2 show a grape-harvester 100, including a tractor 101 generally similar to that shown in the parent application, Serial No. 606,145, filed August 24, 1956. This parent application is referred to for action of the harvester, as such. As shown in these drawings, there is a cutter 102 supported on a retractable plate 103, which is mounted by a bracket 104 on another retractable plate 105, slidable in any convenient manner for movement solely along a direction laterally to the position of the tractor 100. A double-action cylinder 31 is mounted on a suitable stationary bracket 106 with its piston connecting rod 32 secured to the retractable plate 105 by a bracket 107. A supporting column 108 slides over the bracket 106, moving along with the plate 103 and bracket 104. Introduction of suitable fluid at the port 36 of cylinder 31 causes the piston to move to the right and retract the cutter 102; on the other hand, when fluid is introduced into the other port 37, the port 36 is bled and the piston is forced to move to the left, restoring the cutter 102 to its original position.

The movement of the fluid to the ports 36 and 37 of the cylinder 31 is controlled by a valve 40 which, in turn, is operated by a solenoid 41 that is itself controlled indirectly by a novel hydraulic sensing unit 42.

The hydraulic sensing unit 42 incorporates a flexible fluid container 43, such as a rubber hose member with its outer end 44 capped. This container 43 is mounted in some suitable position, preferably on a rigid frame member of the tractor. Therefore, in effect, the senser 42 is rigidly mounted with respect to the tractor 11. The senser 42 is located so that it extends somewhat beyond the end of the cutting bar 102 and is a convenient distance in front of it. The sensing unit 42 will therefore contact a grapestake 46 or grapevine trunk 47 before the cutting bar 102 can touch them; so it will be sure to contact any stake 46 which lies in or very close to the path of the cutting bar 102.

When the senser 42 is deflected, as shown in the upper portion of FIG. 1, the fluid in it is displaced and therefore acts to expand a bellows member 50, to which it is connected by a conduit 51 (see also FIG. 6). The bellows 50 has a stationary end 52 and a moving end 53 connected to the arm 54 of a micro-switch 55.

A ground line 56 connects together the switch arm 54, one side of the valve-controlling solenoid 41, one side of a normally closed switch 57 which forms part of a time-delay mechanism 58, and one side (grounded) of a suitable source 59 of electric power, such as a generator on the tractor 11. The switch terminal 55 is connected to one pole of a relay 60 and in parallel to a normally open relay-controlled switch terminal 62; the other side of the relay 60 and a second normally relay controlled switch terminal 61 are connected to the hot side of the power source 59. The terminal 61 is opposite a pole 63 that is connected by line 64 to the other side of the solenoid 41, while the pole 65 that lies opposite the terminal 62 is connected to the terminal 66 against which the pole 57 is normally closed.

Thus, when the senser 42 strikes a grapestake 46 and flexes, the bellows 50 expands and closes the switch arm 54 against the contact 55. As a result the current from the hot side of the power source 59 flows through the relay 60, energizing it, and via the switch 55, 54 to ground. The energized relay closes the pole 61 against the terminal 63, energizing the solenoid 41, while the pole 62 closes against the terminal 65, activating the time-delay mechanism 58. Then, when the senser 42 passes by the grapestake 46 and the switch arm 54 opens, the relay 60 is kept closed and the solenoid 41 is kept energized until a set time has passed, whereupon the time delay mechanism 58 opens switch 57, de-energizing the relay 60 and the solenoid 41.

When the valve 40 is in the position shown in FIG. 6, the solenoid 41 is de-energized, and the valve 40 connects a supply conduit 70 from a pump 71 to the conduit 39 leading to the port 37. Meanwhile, the conduit 38 is connected to a bleed conduit 72, leading to the reservoir 73; so the rod 32 is moved toward the right, projecting the cutting bar 102 out to the position shown at the bottom of FIG. 1. Energization of the solenoid 41 (by the senser 42 striking a grapestake 55) rotates the valve counter-clockwise, bleeding the conduit 39 and sending fluid into the conduit 38, projecting the rod 32 and retracting the cutting bar 102. De-energization of the solenoid 41 after the time delay restores the valve 40 to the position illustrated, by means of a spring offset.

FIGS. 3 through 6, particularly, illustrate the application of the invention to a French plow 10 which is mounted on and carried by a tractor 11 of conventional type, preferably outboard of the tractor wheels 12 and somewhat forward of them. The plow 10 includes a plate-like supporting frame 13 carried outboard of the tractor body by a suitable framework such as rods 14, 15 and 16 securely anchored to the tractor body, with the rod 14 being shown welded to projecting brackets 17 on the supporting frame 13.

The plowshare 20 is attached to a plate 21 which may be considered as a type of moldboard, although different from that in the usual plow, this being a retractable vineyard plow. It will be noted that provision may be made for attaching the plowshare 20 at various angles, by a series of perforations 22 in the moldboard 21, to any one of which the plowshare 20 may be secured by means of a bolt 23. This sets the angle of the plow.

The moldboard or supporting member 21 may be provided with a pair of projecting cylindrical shafts 25 and 26, which may be formed from pipe stock or from solid rod stock, as desired. The outboard ends of the shafts 25 and 26 are secured together by a crosshead 27 and are mounted for sliding movement relative to the supporting frame 13. This mounting may be provided by concave rollers 28 journaled in the frame 13. By way of example, there may be four pairs of rollers 28; i.e., two pairs in contact with each shaft 25, 26. The rollers 28 prevent relative lateral movement of the shafts 25, 26 and, being concave, confine and guide the shafts 25 and 26 (see FIG. 5). A top plate 29 may provide both a limit member, holding the shafts 25 and 26 in place and preventing displacement of the concave rollers 28 relative to each other, and also a mounting for the journal pins 30.

The shafts 25 and 26 are thus mounted for a relatively low-friction sliding movement between a retracted plowing position shown at the top of FIG. 3 and a normal plowing position shown at the bottom of FIG. 3. The motive power for moving them between these positions and holding them in either position may be provided by a hydraulic or pneumatic apparatus comprising a cylinder 31 whose piston is provided with a connecting rod 32. The outer end of the connecting rod 32 is rigidly secured to the crossshead 27, while the cylinder 31 is secured by a pivoted mounting 32 to the supporting frame 13. Thus, when the connecting rod 32 is extended as in FIG. 4 and in the top part of FIG. 3, the plowshare 20 is retracted; while when the connecting rod 32 is drawn into the cylinder 31, as shown in the bottom part of FIG. 3, the plowshare 20 is projected out to its normal plowing position. The line which the outer edge of the plowshare 20 follows during plowing, by virtue of its alternate projection and retraction, is indicated by the dot-dash line 35.

The cylinder 31 is preferably double acting. Introduction of fluid into its outer port 36 causes the piston and connecting rod 32 to move inwardly (i.e., to the right in FIGS. 1 and 2) and retract the plowshare 20. On the other hand, movement of fluid into its inner port 37 causes the piston and connecting rod 32 to move outwardly (i.e., to the left in FIGS. 3 and 4) and to carry the plowshare 20 out to its normal plowing position. A conduit 38 connected to the outer port 36 and another conduit 39 connected to the inner port 37, both lead to a four-port valve 40, shown in FIG. 6. (Note that in FIG. 6 the outer port 36 is at the right-hand side instead of the left-hand side, as in FIGS. 3 and 4, and that the inner port 37 is similarly reversed.)

The container 43 is preferably mounted on a rigid frame member 45 which may be secured to the vertex of the frame members 14, 15 and 16. The senser 42 then extends somewhat beyond the plow moldboard 21 and the plowshare 20. Operation of the circuit is exactly the same as that heretofore described, and the same reference numerals are used to indicate the same parts. In this event, the plowshare 20 is retracted by the contacting of the sensing unit 42 with the grapestake or grapevine and the operation is therefore substantially the same, except that the plowshare 20 has been shown in place of a cutter 102.

To those skilled in the art to which this invention relates, many changes in construction and widely differing embodiments and applications of the invention will suggest themselves without departing from the spirit and scope of the invention. For example, the sensing unit need not be hydraulic, as shown, although that does have many advantages. For some cases, however, the senser may be electronic—e.g., a photoelectric beam or a radio frequency carrier—or it may be mechanical, such as a spring steel finder, which may activate a microswitch or a hydraulic or pneumatic circuit. The disclosures and the description herein are purely illustrative and are not intended to be in any sense limiting.

1. A device for sidewise retraction of a working portion of a machine relative to a frame of said machine, as said machine is working parallel to a row of obstructions and in between the obstructions of the row, comprising an hydraulic sensing device on said frame having a flexible senser head that flexes under pressure; a bellows device on said frame hydraulically connected to said senser head; means on said frame to translate said working portion sidewise a predetermined lateral distance relative to said frame; actuation means on said frame actuated by said bellows device for actuating the translating means; and time-delay means supported by said frame and operatively connected to said translating means for delaying return movement of the translating means and thereby delaying restoration of said working portion to its unretracted position after de-actuation of said actuation means.

2. A device for sidewise retraction of a working portion of a machine relative to a frame of said machine, as said machine is working parallel to a row of obstructions and in between the obstructions of the row, comprising an hydraulic sensing device on said frame having a flexible senser head that flexes under pressure; a bellows device on said frame hydraulically connected to said senser head; and translating means on said frame including an electrical circuit having electrically energized means on said frame for translating said working portion sidewise a predetermined lateral distance relative to said frame, a spring-urged normally open electrical switch on said frame and in said circuit actuated by said bellows device for actuating said translating means, and a time-delay relay on said frame for maintaining energization of said electrically energized means after said switch is opened.

3. A device for sidewise retraction of a working portion of a machine relative to a frame of said machine, as said machine is working parallel to a row of obstructions and in between the obstructions of the row, comprising an hydraulic sensing device on said frame having a hollow flexible member with one end closed to provide a senser head that flexes under pressure and another end and filled with fluid; a bellows device on said frame hydraulically connected to said other end of said senser head; electrical translating means on said frame to translate said working portion sidewise a predetermined lateral distance relative to said frame, said translating means retracting said frame when energized and holding it retracted as long as it is energized and then returning it from its retracted position; an electrical switch on said frame closed by said bellows device for energizing the translating means and causing it to retract said working portion; and a time-delay relay on said frame operatively connected to said translating means to hold said working portion retracted for a predetermined time after said switch is opened.

4. A hydraulic sensing and actuating device, comprising a hollow flexible member with one end closed, a bellows connected to the other end of said member, said member being filled with hydraulic fluid, a switch operated by said bellows, circuit means including electrical means energized by said switch, and a time-delay relay in said circuit with means connected to said electrical means to hold said electrical means energized for a predetermined time after said switch has opened.

References Cited in the file of this patent

UNITED STATES PATENTS

| | | |
|---|---|---|
| 1,307,672 | Johnson | June 24, 1919 |
| 1,417,221 | Yuasa | May 23, 1922 |
| 1,836,655 | Dunford | Dec. 15, 1931 |
| 1,925,763 | Kirschen | Sept. 5, 1933 |
| 2,438,224 | Marihart | Mar. 23, 1948 |
| 2,442,095 | Reed et al. | May 25, 1948 |
| 2,489,633 | Fulgham | Nov. 29, 1949 |
| 2,608,146 | Lund | Aug. 26, 1952 |
| 2,699,025 | Goss | Jan. 11, 1955 |
| 2,749,824 | Friday | June 12, 1956 |
| 2,804,004 | Hubalek et al. | Aug. 27, 1957 |
| 2,815,633 | Meyer | Dec. 10, 1957 |

FOREIGN PATENTS

| | | |
|---|---|---|
| 648,383 | France | Aug. 13, 1928 |